United States Patent [19]
Marti Sala

[11] Patent Number: 5,769,203
[45] Date of Patent: Jun. 23, 1998

[54] AUTOMATED FACILITY FOR THE UNSCRAMBLING OF LIGHT, HOLLOW, ELONGATED ARTICLES AND FOR THE LINED UP DELIVERY OF SAID ARTICLES

[76] Inventor: Jaime Marti Sala, Emancipación, 8, Barcelona, Spain, 08017

[21] Appl. No.: 555,751

[22] Filed: Nov. 9, 1995

[30] Foreign Application Priority Data

| Nov. 9, 1994 | [ES] | Spain | 9402348 |
| Feb. 6, 1995 | [ES] | Spain | 9500291 |
| Jun. 5, 1995 | [ES] | Spain | 9501119 |

[51] Int. Cl.$^6$ .................................................. B65G 47/24
[52] U.S. Cl. ............... 198/397; 198/803.01; 198/803.14
[58] Field of Search ................................... 198/392, 397, 198/450, 473.1, 803.01, 398, 399, 803.14, 351, 352, 604, 607, 377; 221/171, 172, 167, 169

[56] References Cited

U.S. PATENT DOCUMENTS

| 2,732,925 | 1/1956 | Pechy | 198/377 |
| 3,004,651 | 10/1961 | Manspeaker et al. | 198/607 |
| 3,342,304 | 9/1967 | Greulich | 198/803.01 |
| 3,367,472 | 2/1968 | Rossi | 198/377 |
| 3,530,971 | 9/1970 | Babunovic | 198/377 |
| 3,556,282 | 1/1971 | Moeltzner | 198/397 |
| 3,563,479 | 2/1971 | Brouwer et al. | 198/352 |
| 3,637,064 | 1/1972 | Cvacho et al. | 198/450 |
| 3,650,368 | 3/1972 | Nalbach | 198/397 |
| 3,662,872 | 5/1972 | Nalbach | 198/397 |
| 4,033,450 | 7/1977 | Paddock et al. | 198/803.01 |
| 4,130,194 | 12/1978 | Schindel et al. | 198/397 |
| 4,263,837 | 4/1981 | Tassie | 198/803.14 |
| 4,681,208 | 7/1987 | Harringer et al. | 198/341 |
| 4,681,209 | 7/1987 | Marti | 198/392 |
| 4,802,571 | 2/1989 | Born et al. | 198/817 |
| 5,065,852 | 11/1991 | Marti | 198/392 |
| 5,197,586 | 3/1993 | Marti | 198/462 |

*Primary Examiner*—Joseph E. Valenza
*Attorney, Agent, or Firm*—Jacobson, Price, Holman & Stern, PLLC

[57] ABSTRACT

An automated facility for the unscrambling of light, hollow, elongated articles and for the lined up delivery of the articles, such as empty plastic containers. Several article unscrambling and lining up units are interconnected so as to deliver articles in a preunscrambled arrangement to discharge chutes which convey the articles along a closed circuit with their bottom slidingly resting on a floor. These discharge chutes are delimited by a casing. A first opening is provided in the floor and the casing includes a second opening next to the first opening. A conveyor bearing a plurality of article receiver members is arranged to receive articles from the chutes. The facility includes structure to synchronize the speed of the conveyor and of the unscrambling units in such a way that each of the units does cyclically discharge an article into one of every n article receiver members of the conveyor, n being equal to the number of units of the facility. The article receiver members already loaded with an article are placed between the chutes, conveniently spaced, of the remaining units.

18 Claims, 8 Drawing Sheets

AUTOMATED FACILITY FOR THE UNSCRAMBLING OF LIGHT, HOLLOW, ELONGATED ARTICLES AND FOR THE LINED UP DELIVERY OF SAID ARTICLES

BACKGROUND OF THE INVENTION

The object of the present invention concerns a facility for the unscrambling of light, hollow, elongated articles and for the lined up delivery of said articles such as empty containers made of plastics material with a body and a neck and in particular with an unstable bottom which have to be fed at a high speed into a filling line, said facility comprising at least an article unscrambling and lining up unit which delivers said articles one by one and in a preunscrambled arrangement to the inside of discharge chutes travelling along a closed circuit and in general turning around an axis thereby conveying said articles in a vertical or slightly inclined position slidingly resting on a supporting stationary floor, said discharge chutes being delimited by a casing provided with a lateral opening through which the articles are evacuated to the outside onto a conveyor which is tangential to said supporting stationary floor.

U.S. Pat. No. 4,130,194 (Schindel), U.S. Pat. No. 4,681,209 (MARTI) and U.S. Pat. No. 5,065,852 (MARTI) describe rotary units of the mentioned type for the unscrambling and lining up of plastic bottles in an upright position.

A drawback of said unscrambling and aligning units lies in the fact that containers are delivered notably spaced apart from each other especially in those units having a big diameter, i.e. they normally leave a space between bottles more or less equivalent to the bottle height, this meaning the lineal speed of the conveyor is often much greater that the average speed of the bottle line to properly feeding it. This produces a stop and start situation (braking and accelerations of the bottles) which can affect the surface quality of the bottles being unscrambled.

U.S. Pat. No. 5,197,586 describes a unit conceived to be coupled to an unscrambler unit such as the above-mentioned ones, said unit being precisely provided to facilitate the ulterior operation of bringing the containers closer together up to their mutual contact on said linear exit conveyor.

In order to solve this problem discharge chutes and the casing delimiting them adopt in said unscrambling units a generally frustoconical configuration provided on the one hand to decelerate the articles and facilitate their transfer in an upright position onto said exit conveyor, and also for the purpose of bringing the containers nearer to each other when they leave the rotary unscrambler.

But the above-mentioned frustoconical construction of said casing as well as the arrangement in the shape of a frustoconical drum of the discharge chutes of said rotary unscramblers involve a series of drawbacks:

—the casing has a high manufacturing cost, particularly taking into account the substantial diameters of said machines in order to achieve a high production and to handle big-sized containers;

—the containers have to descend in a chute which is arranged—along its motion in a closed circuit—in such a way that it is substantially inclined towards the outside (much more so than the turning axis of the unscrambler), which does not favor the falling by gravity of said containers which can hence get stuck in said chutes;

—the transfer of the containers onto the exit conveyor does always take place through a lateral opening provided in the casing, which brings about stability problems with the containers imposing limitations to the speed of the rotary unit and the conveyor and hence limiting the efficiency of the unscrambling and aligning unit.

Another typical solution consists in joining several unscramblers together by the traditional method of "combiners" or gatting systems consisting in taking groups of bottles alternatively from several unscramblers. These systems run on a continuous stop-start cycle, since only one group of bottles can be used at a time. These continuous stops also cause stoppages on other equipment in the line unless long conveyors are used to store the accumulated bottles waiting their turn at the gate to send bottles down the line. Long conveyors are also usually needed after the gate.

Moreover the use of said unscrambling units to handle empty bottles having an unstable bottom even using special and complex exit conveyors are in general not compatible with very high speed bottling lines.

The present facility seeks to solve the above-mentioned drawbacks in an efficient and practical way thereby lowering the manufacturing costs and substantially increasing the efficiency, the versatility and the operational safety.

BRIEF SUMMARY OF THE INVENTION

The facility according to the invention consists in a combination of in general some unscrambling and lining up units with an endless chain conveyor fitted with a plurality of article receiver members which are close together and whose speed is completely synchronised with the discharge chutes of the unscrambling unit. This means that bottles leave their discharge chute at the same lineal speed that they attained inside the unscrambler and then drop into the receiver members which are perfectly positioned beneath the discharge chutes of the corresponding units to receive them.

Furthermore the casing and annular arrangement of discharge chutes of said unscrambling units are now carried out in a cylindrical configuration coaxially to the rotation axis of a disk carrying cavities for a preunscrambling of the containers, which axis is substantially inclined with respect to the vertical. And the discharge of the containers from the rotary unscrambler instead of being lateral, tangentially to the annular stationary floor as in the disclosed prior art machines, will now be effected by gravity through an opening of said annular stationary floor underneath which said endless conveyor equipped with a series of article receiver members is arranged. Moreover said article receiver members are here removable and are linked in a hinged connection to said conveyor in such a way that they are capable of adopting at least two positions as will be later detailed.

Other characteristics and the advantages of the invention will become more apparent when reading the following description illustrated with the accompanying drawings.

DETAILED DESCRIPTION

Figure 1A:
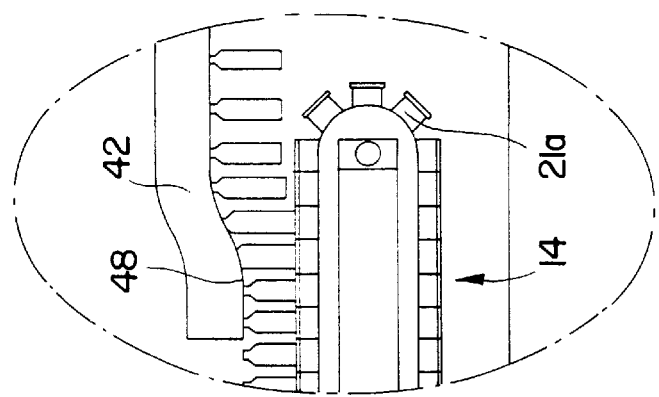
FIG. 1a is a detail of the final transfer station.

According to these figures the facility being the object of the present invention consists of at least two rotary article unscrambling and lining up units having a general structure known in itself such as that described in U.S. Pat. No. 4,681,208 and U.S. Pat. No. 5,065,852 and represented in FIG. 8, each of said units comprising:

—a hopper 2 to receive a plurality of articles 3 accumulated at random on its bottom 8 which has an edge 7 spaced apart from the inner wall 67 of the hopper in order to allow the passage of said articles therethrough;

—a disk 4 mounted in said hopper and rotating around an inclined axis 5;

—a series of open-bottom cavities 6 associated to the periphery of said rotating disk 4 and arranged below said edge 7 of said bottom in such a way that they are capable of receiving the articles 3 to hold them in a lying position, said cavities 6 integrating members 9 provided to hold a part of said articles 3;

—a series of discharge chutes 10 whose number is equivalent to that of cavities 6 and which are attached to said rotary disk 4 and delimited by a casing 11, said discharge chutes extending downwards from a zone below a corresponding cavity 6 up to their outlet end on a stationary annular floor 12;

—a stationary annular shelf 13 attached to said casing 11 and extending below said peripheral cavities 6 in such a way that it is interposed between the open bottom of said cavities and said discharge chutes 10 and presents an interruption thus allowing a transfer of the articles 3 which fall by gravity and in a preunscrambled condition from said cavities 6 into said discharge chutes 10 thereby being at the same time oriented in an upright position to be thereupon conveyed by said discharge chutes 10 with their bottoms slidingly resting on said annular floor 12.

According to the invention the facility comprises:

—a first opening 22 provided in said stationary annular floor 12 of each of the units;

—a second opening 39 in a lower lateral sector of said casing 11 of each unit, said second opening 39 being placed next to said first opening 22;

—flexible driving means, such as an endless chain conveyor 14 associated to a driving motor running along a closed circuit and comprising an upper out feeding strand and a lower return strand, provided with a plurality of article receiver members 21, 21a, 70 which are apt to receive articles 3, 3a, said upper out feeding strand extending along an area situated below said first opening 22 in such a way that said article receiver members 21 are at a given time close to the lower end of said discharge chutes 10 and operationally coaligned with them for the transfer by gravity of said articles to the inside of said article receiver members, said transfer by gravity taking place when said articles fall through said first opening 22.

Figure 8:
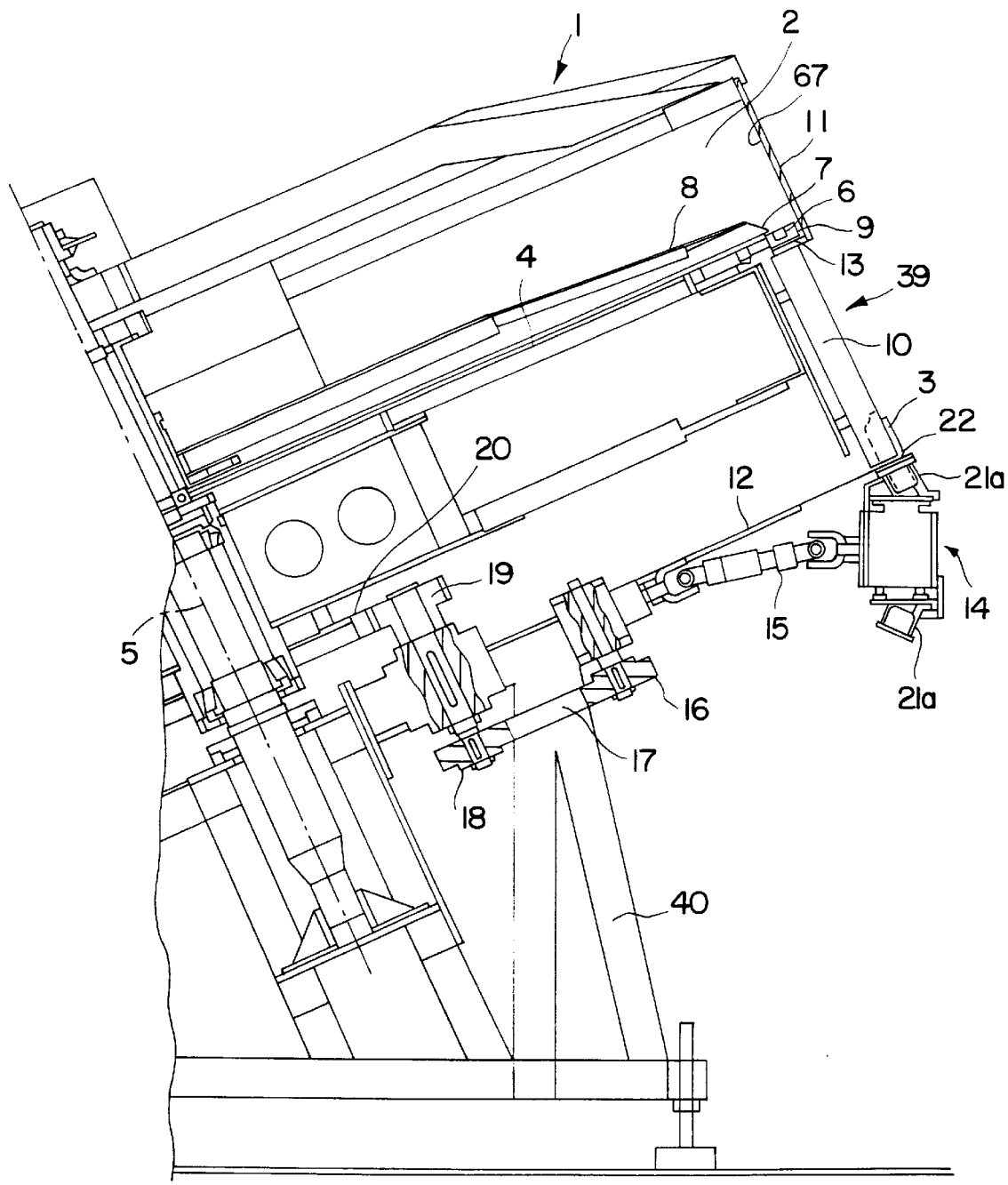
FIG. 8 shows a partial lateral elevation of an unscrambling unit operationally coupled with an exit conveyor with article receiver members as per the previous explanation according to a preferred embodiment of the invention.

Synchronized by means of a kinematic chain transmission integrated by members 15, 16, 17, 18, 19 and 20 known in themselves and shown in FIG. 8, said rotary unscrambler units 1 are coupled with said exit endless chain conveyor 14.

The assembly comprises a removal station 41 provided to transfer the containers from said first conveyor 14 to a second conveyor 42 operable to feed a filling line.

In order to guarantee a correct positioning of the series of container receiver members 21 carrying containers on conveyor 14, which is mounted on a sill of adjustable height, guides 60 and 60a (FIG. 4) have been provided at both sides of the assembly 14 of container receiver members 21, or at least at one side (guide 36 as in FIG. 9) thereof. An uniform conveyance of said container receiver members 21, 21a, 70 is thereby provided along said first conveyor 14, in such a way that said container receiver members 21, 21a, 70 are arranged in the vertical of the point of transfer of containers 3 from said units 1, 1a.

Taking into account that by means of said exit conveyor 14, 14a, 14b containers 3, 3a can be received from two or more unscramblers 1, 1a, their speed can be adjusted to not too high valves, in order to avoid excessive inertia problems in the transfer of the containers 3 which are supposed to fall by gravity into the container receiver members 21 of said first conveyor 4 whose production will be twice or η times as big as that which could be attained with only one of said article unscrambling and lining up units.

Means to synchronize the speed of said exit conveyor 14, 14a, 14b and of said unscrambler units 1, 1a have been provided in such a way that each container unscrambling and lining up unit 1, 1a does cyclically discharge a container a 3, 3a into one of every A article receiver members 21, 21a, 70 of said conveyor 14, n being equal to the number of unscrambler units 1, 1a of the facility, said group of n article receiver members 21, 21a 70 being thus filled according to an ordered sequence. Furthermore, and as it can be appreciated in FIG. 1 those article receiver members 21a already loaded with a bottle 3 are placed between the discharge chutes 10 of the remaining unscrambler units 1a, these latter discharge chutes 10 being for such a purpose conveniently spaced (at a distance depending of the number of units 1, 1a of the facility), so as said articles 3, 3a entering said area through said second opening 39 of said units 1.

In said container receiver members 21 of the first conveyor 14 have been incorporated (FIG. 4) metal stems 43 which constitute particular identification elements (for example of bigger or smaller length) in accordance with the unscrambler unit 1, 1a which is supposed to load them, associated with detector means 44 provided to detect them during their travel, said detector means being governed by conventional electronic control means and thus allowing to synchronize the discharge of containers 3 into the container receiver members 21 in the sequential and ordered way as described.

As can be appreciated in FIGS. 3 to 6, the diameter of the holding aperture of each container receiver member 21 is such that it acts as a gager for the acceptable diameter of said containers 3 thus allowing to dimensionally discriminate the containers, in such a way that any deformed or defective container 3 acceding to said container receiver members is not allowed into the holding aperture and is thus discarded.

In order to be in a position to handle different containers 3, 3a it has been foreseen that said container receiver members 21 comprise an outer shell and removable liners 61 which can be interchanged and are apt to fit snugly into each holding aperture in order to accommodate the dimensions of the containers to be handled and to thus fulfill the above-mentioned function as diametral gageing means.

Figure 3:
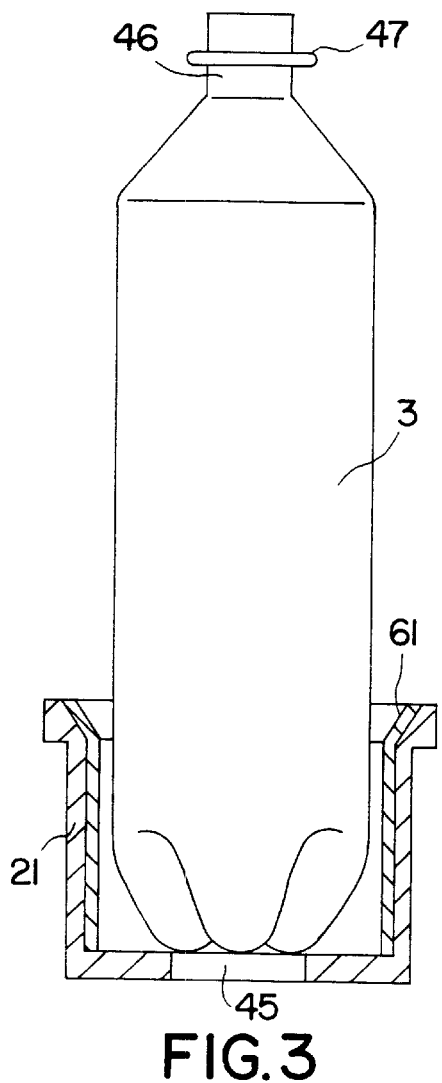
FIG. 3 illustrates in an elevational view the arrangement of a bottle with an unstable bottom (for example of the petaloid type) inserted inside a container receiver member.
Figure 4:
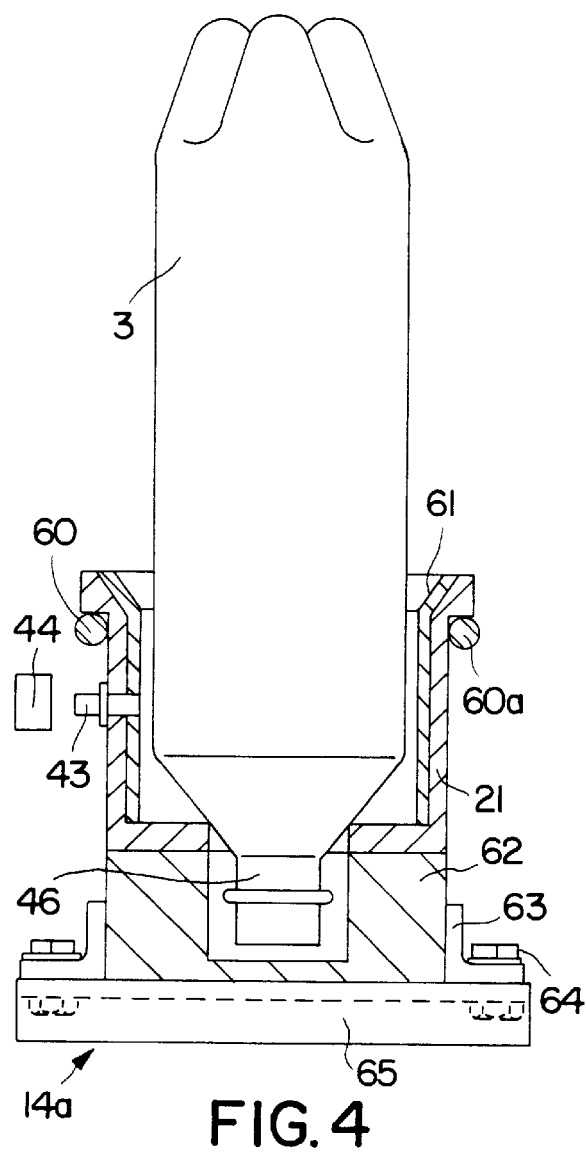
FIG. 4 shows an elevational and sectional view of a container receiver member attached to an endless conveyor belt, with the particularity that the container it holds is in an inverted position and with its neck inserted through a hole provided in the bottom of said container receiver member.
Figure 5:
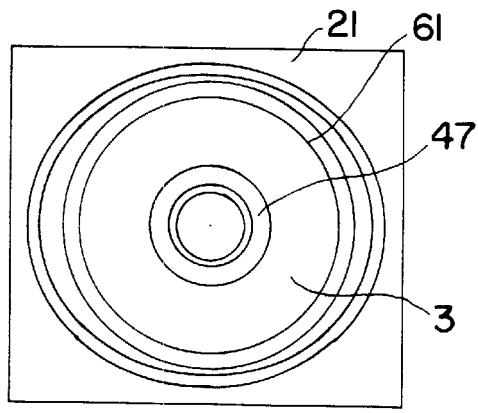
FIGS. 5 and 6 are both plan-views of the previous FIGS. 3 and 4, respectively.
Figure 6:
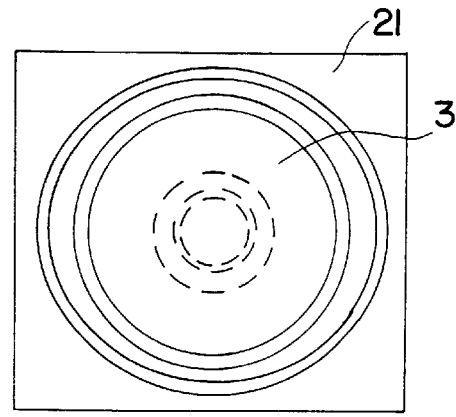

In said FIGS. 3 and 4 it can also be seen that in the bottom of said container receiver members 21 an opening 45 has been provided with such a diameter that it allows the passage therethrough of the neck 46 of a container 3 if the latter does accidentally accede to said container receiver member 21 in an inverted position (FIG. 4), said bottom being thus placed at a shorter height with respect to the plane of the exit conveyor 14. This determines that said container will not be picked up by the transfer means which are provided at the removal station 41 and which for these containers 3 with an annular collar 47 around their neck 46 consist in guides 48 (see FIG. 1a) which pick them up by said collar 47 to thus introduce them into a second conveyor 42 for example of the air conveyor type known in itself (such as for example those described in patent U.S. Pat. No. 3,953,076 or DE-25 09 469), said guides 48 finding themselves at a higher level above the containers 3 if the latter happen to be upside down as shown in FIG. 4. When the container receiver members 21 invert their position at the start of the lower return strand of conveyor 14 said containers being upside down will be directly discharged onto the floor or into a collecting box not shown.

Figure 1:
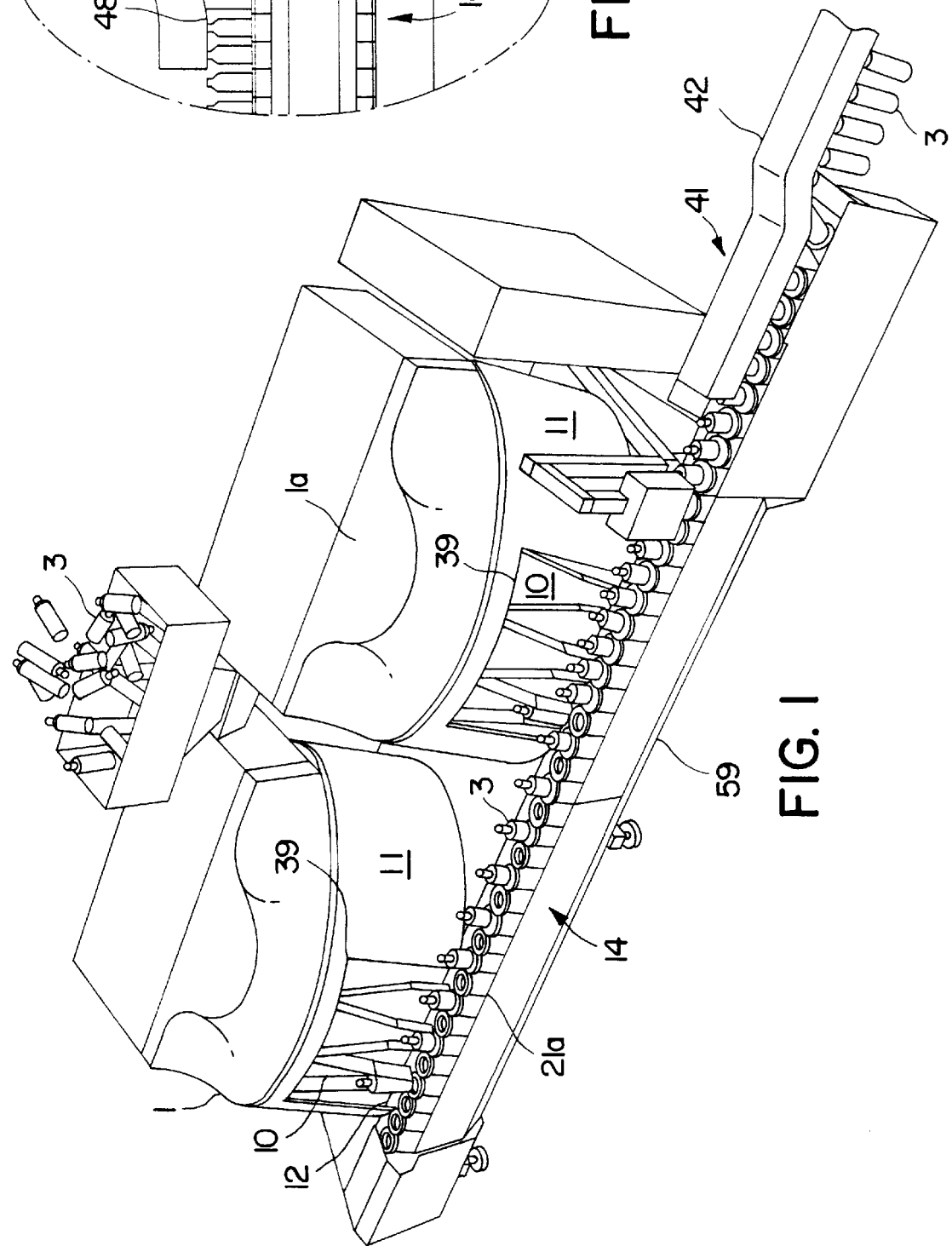
FIG. 1 is a perspective view showing a facility as per the invention including an endless chain conveyor provided with a plurality of container receiver members which are apt to receive bottles from two container unscrambling and lining up units such as those described, said view clearly illustrating the operation of the facility and its main components.
Figure 2:
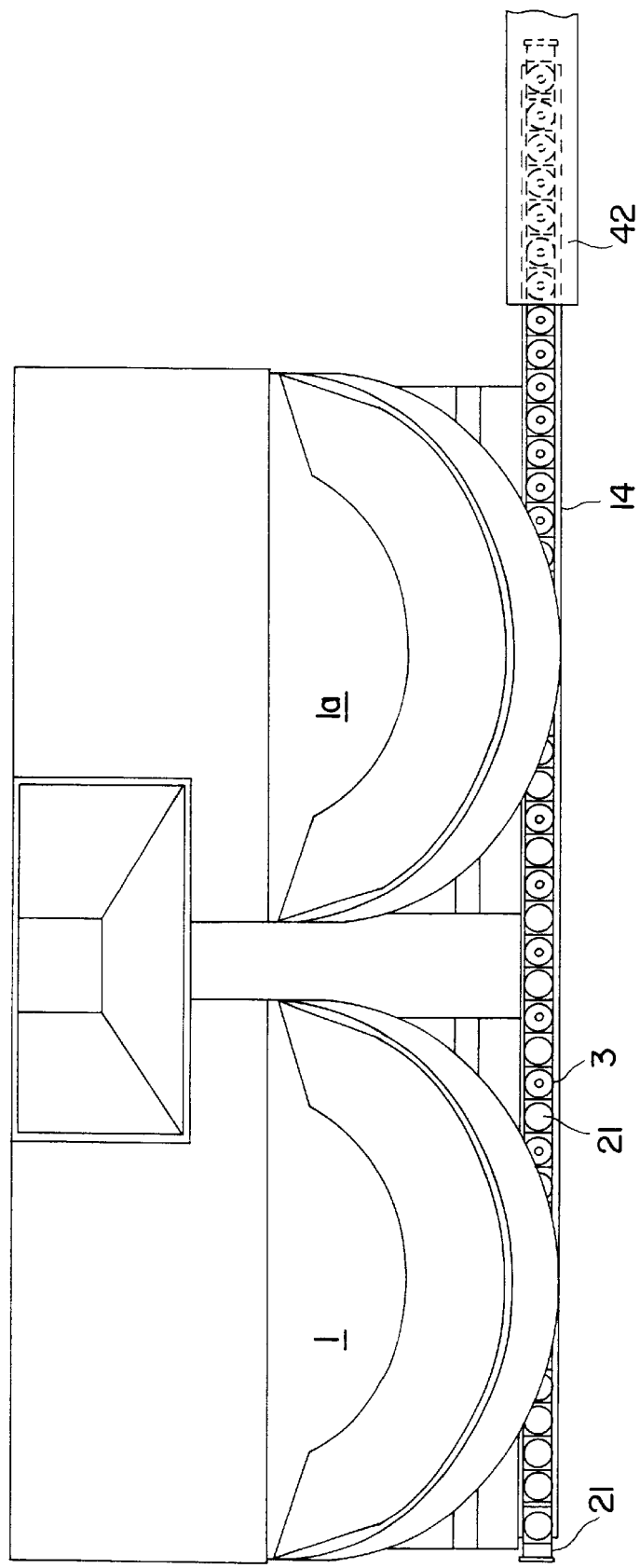
FIG. 2 is a plan-view of the FIG. 1.

Said guides 48 for collar 47 of the containers adopt a progressively ascending slant with respect to the sense of travel of said first conveyor 14 in order to thus facilitate an adequate removal of the containers 3 from inside the container receiver members 21 of said conveyor as the latter progresses in its travel, as shown in said FIG. 1.

FIG. 4 shows an example of a possible embodiment of the exit conveyor 14a with the container receiver members 21 attached through lateral members 62 which leave a free central space and through brackets 63 and bolts 64 are attached to an endless conveyor belt 65 to thus guarantee a firm attachment of said container receiver members 21 to said belt 65.

Figure 7:
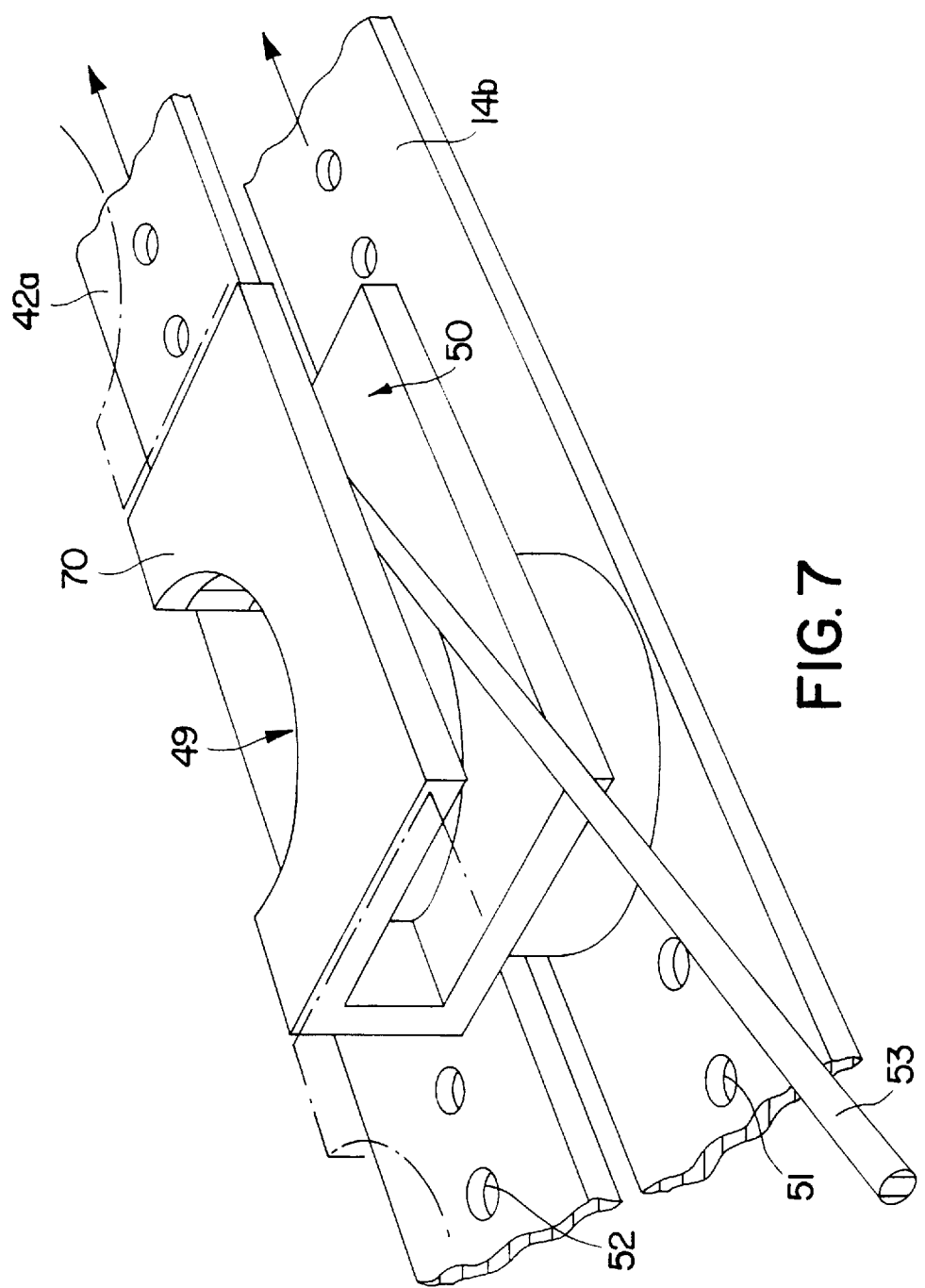
FIG. 7 shows a detail of a container receiver member with a semicircular hollow to convey flat bottom containers, associated with a first conveyor, with discharge means for the transfer of said containers to an adjacent lateral conveyor.

As shown in FIG. 7, for the purpose of handling containers with a stable bottom the container receiver members 70 of the exit conveyor 14b have been given an alternative, different configuration, with a lateral opening 49 for the transversal removal of the containers 3 towards an adjacent lateral conveyor 42a. Both conveyors 14b and 42a have holes 51 and 52 through which lower suction means can act as per a technique known in itself and can thus contribute to improve the stability of the containers during their conveying. Opposite to said opening 49 said container receiver members 70 have a deep recess 50 which reaches the cavity of container receiver member 70, and a stationary lateral bar 53 has been provided which extends obliquely above said first conveyor 14 and affects said recess 50 when said container receiver members 70 pass said bar, the latter acting as a switch for transferring the containers to said second conveyor 42a which is coplanar with and adjacent to the first one 14b and travels at the same speed.

According to a preferred embodiment of the invention shown in FIG. 8, each of the container unscrambling and lining up units 1 employed comprises a hopper 2 and a casing 11 formed by a cylindrical shell (supported on a frame 40) whose symmetry axis coincides with the geometric rotation axis 5 of said inclined, rotary disk 4, said discharge chutes 10 being as well distributed in an arrangement in the shape of a cylindrical drum coaxial with said inclined rotation axis 5. This allows mainly to obtain an important saving in the manufacturing cost for said units as compared with the frustoconical casings of the prior art.

In order to increase the adaptability of the machine to different kinds of articles it has been foreseen to link the article receiver members 21a to said conveyor 14 in a hinged connection, in such a way that they are capable of adopting at least two positions: a first one with the inlet 21c of the holding aperture of said article receiver members 21 very close to and facing said opening 22 of the annular floor 12, as shown in FIG. 8, and with the axis 23 of the holding aperture of the article receiver member 21 in an inclined position and coaligned with the axis of said discharge chutes 10, and a second position with said axis 23 of the holding aperture of the article receiver member 21 conveniently oriented in correspondence with the sequential positioning of said article receiver members 21 next to said transfer station. The passage of the articles, which in the example illustrated in the drawings are plastic bottles 3, 3a, to the inside of the article receiver members is in this way carried out without any deceleration whatsoever and following a linear axis from said discharge chutes 10 to the inside of said article receiver members 21, which enhances the smoothness of operation of the facility.

Figure 12:
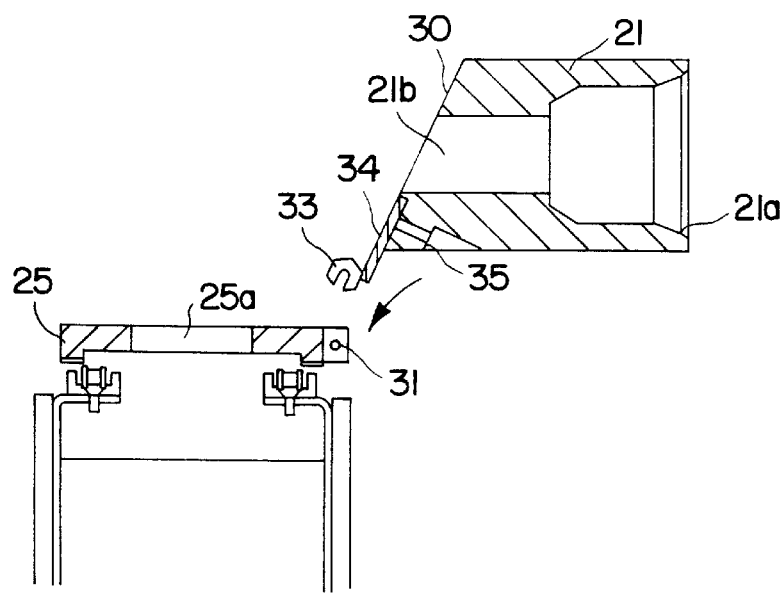
FIG. 12 is a view equivalent to the two previous ones, showing how said article receiver members can be removed thereby constituting an interchangeable unit for adaptation to different formats of the articles.

Article receiver members 21 are besides removably linked to conveyor 14 in such a way that they can be removed from the latter in a very simple and quick way as shown by FIG. 12, thereby constituting interchangeable units with a format adapted to that of the articles 3, 3a to be handled.

Figure 10:
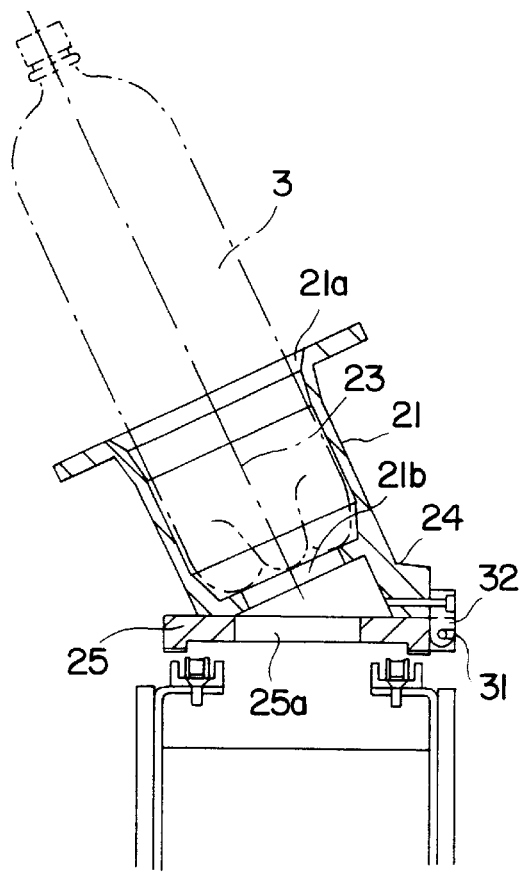
FIGS. 10 and 11 show both the inclined and vertical positions that can be adopted an article receiver member articulated to said endless chain conveyor.
Figure 11:
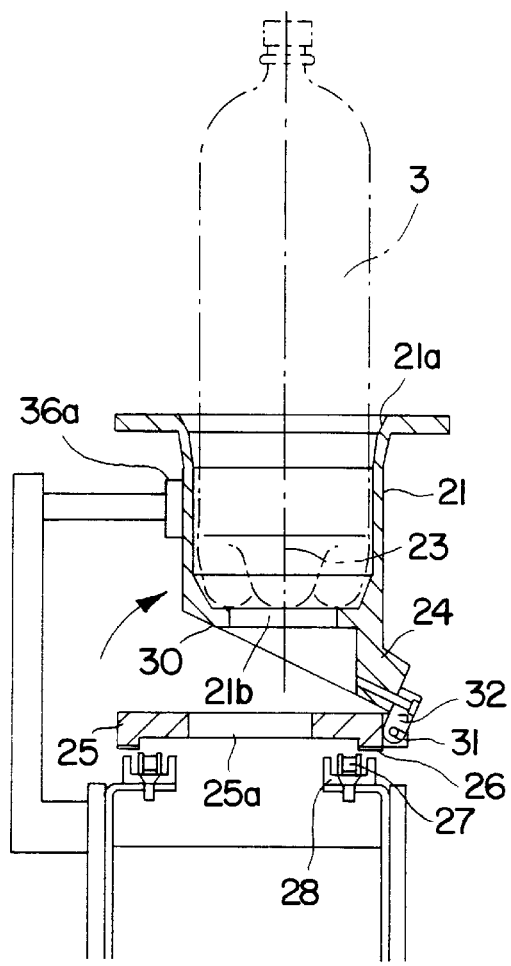

At a lateral region of their base 30 the article receiver members 21 provided to hold and convey the articles 3, 3a are linked in a hinged connection with a plate 25 with a through hole 25a linked to an endless chain conveyor 14, and said base 30 is oblique with respect to the symmetry axis 23 of the holding aperture of the article receiver member 21, in such a way that said article receiver members 21 tend by gravity to rest with said base 30 on said plate 25 in an inclined position, with correspondence between hole 21b of the bottom or article receiver member 21 and said opening 25a of plate 25. All this can be clearly appreciated in FIGS. 9, 10 and 11.

It can be seen in the same figures that the hinged connection of said article receiver members 21 with said plate 25 comprises on the one hand a pin 31 mounted in a recess of a lateral portion of said plate 25 at the side of conveyor 14 which is farther away from the rotary unscrambler unit 1, and on the other hand two elements 32 with a hook-like configuration and apt to engage said pin 31 and to turn on it, in such a way that in a first position in which said article receiver members 21 are resting with their oblique base 30 on said plate 25 said hook-like elements 32 are imprisoned by said pin 31, whereas in a second position in which said article receiver members 21 are sensibly raised and inclined towards the outside said hook-like elements 32 can be released from said pin 31.

In a preferred embodiment of the invention shown in FIG. 12 said elements 32 with a hook-like configuration are formed by cylinders 33 which have a deep radial opening and at their outside are solid with a plate 34 which by means of screws 35 is fastened to a lateral region of the oblique base 30 of an article receiver member 21.

Figure 9:
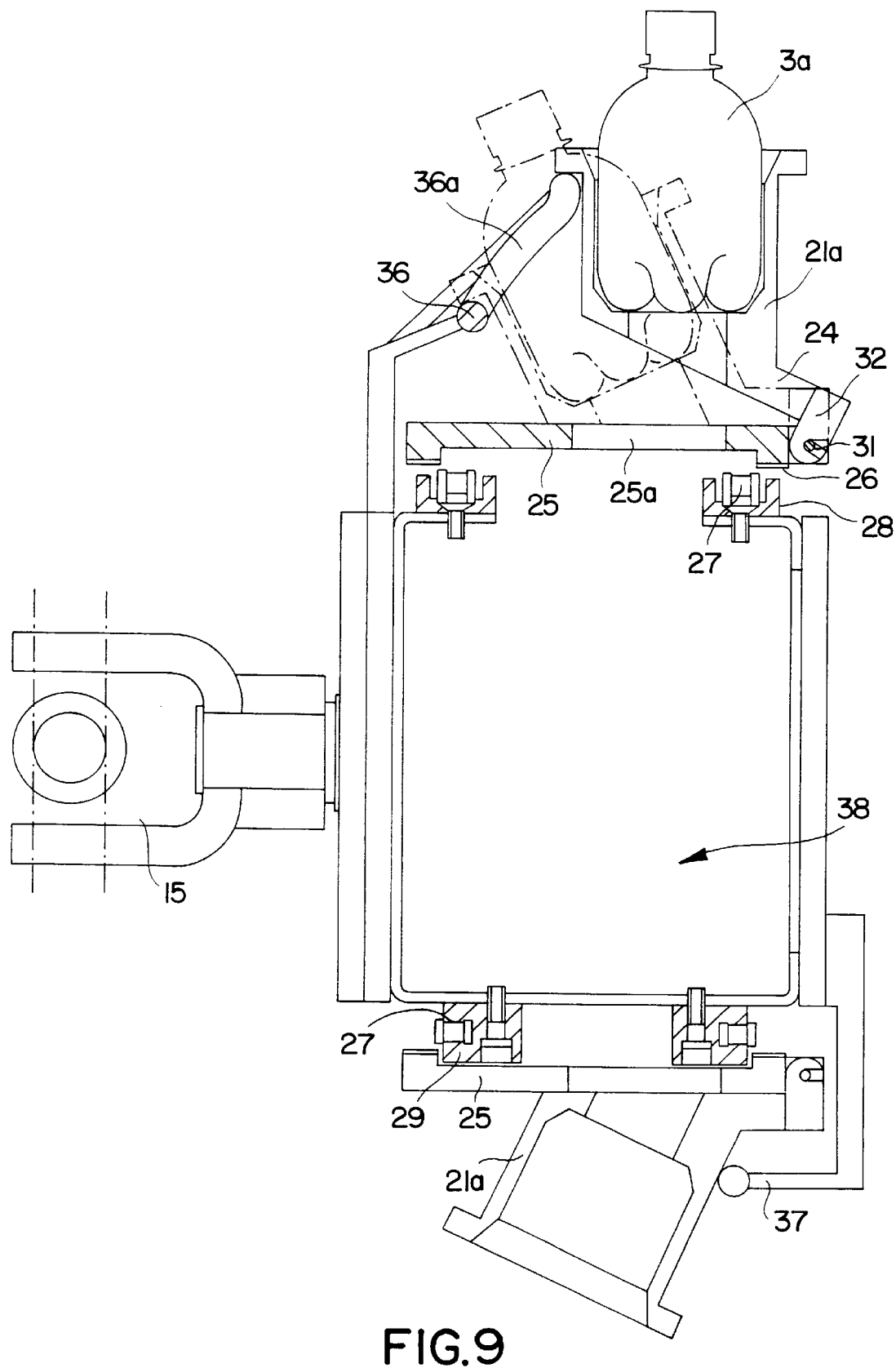
FIG. 9 is an enlarged detail view showing said endless chain conveyor and associated receiver members sectioned along a vertical plane.

As shown in FIG. 9, at the upper part of conveyor 14 and at its side which is closer to the unscrambler unit 1 a guide 36 has been provided which is very close to the row of article receiver members 21 linked to said conveyor 14, said guide comprising a portion 36a which is ascendingly biased towards the inside and is provided to cause the article receiver members 21 to tilt and thus be raised towards a vertical position in correspondence with said transfer station 41 which can consist for example in an air conveyor 42 provided to pick up the containers by their neck and mounted at the end zone of endless conveyor 14 there where the article receiver members tend to invert their position thereby turning with a big turning radius, which facilitates the transfer to said second conveyor 42.

In order to prevent the article receiver members from coming loose at the lower strand of conveyor 14 a second guide 37 has been provided at the conveyor side which is farther away from the unscrambler units 1, said article receiver members 21 then laterally resting on said second guide 37 which thus maintains said article receiver members 21 in a position in which their base 30 is in full contact with plate 25 linked to conveyor 14.

As has been said before, below the upper strand of conveyor 14 there is a low-pressure enclosure 38 provided to contribute to a better retention of articles 3 in the holding apertures of article receiver members 21 whose bottom 21b is open and aligned with hole 25a of plates 25 which communicates with said low-pressure enclosure 38.

As it can be appreciated especially in FIG. 9, plates 25 are linked by means of brackets 26 in the shape of an inverted "L" to links 27 which belong to an endless chain conveyor and are guided in upper 28 and lower 29 guides.

Figure 14:
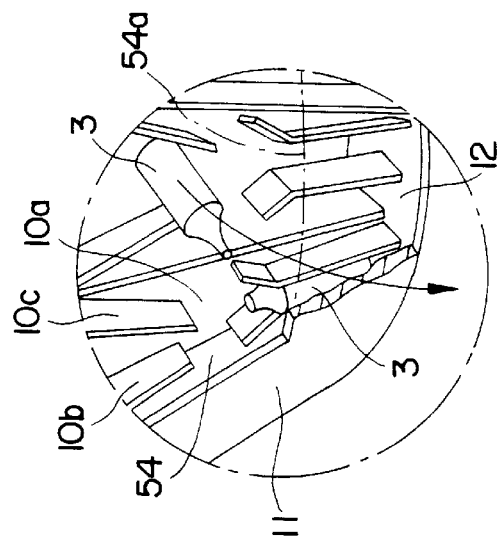
FIG. 14 is an enlarged perspective view of said lateral opening for the dropping out of wrongly positioned or defective containers.
Figure 13:
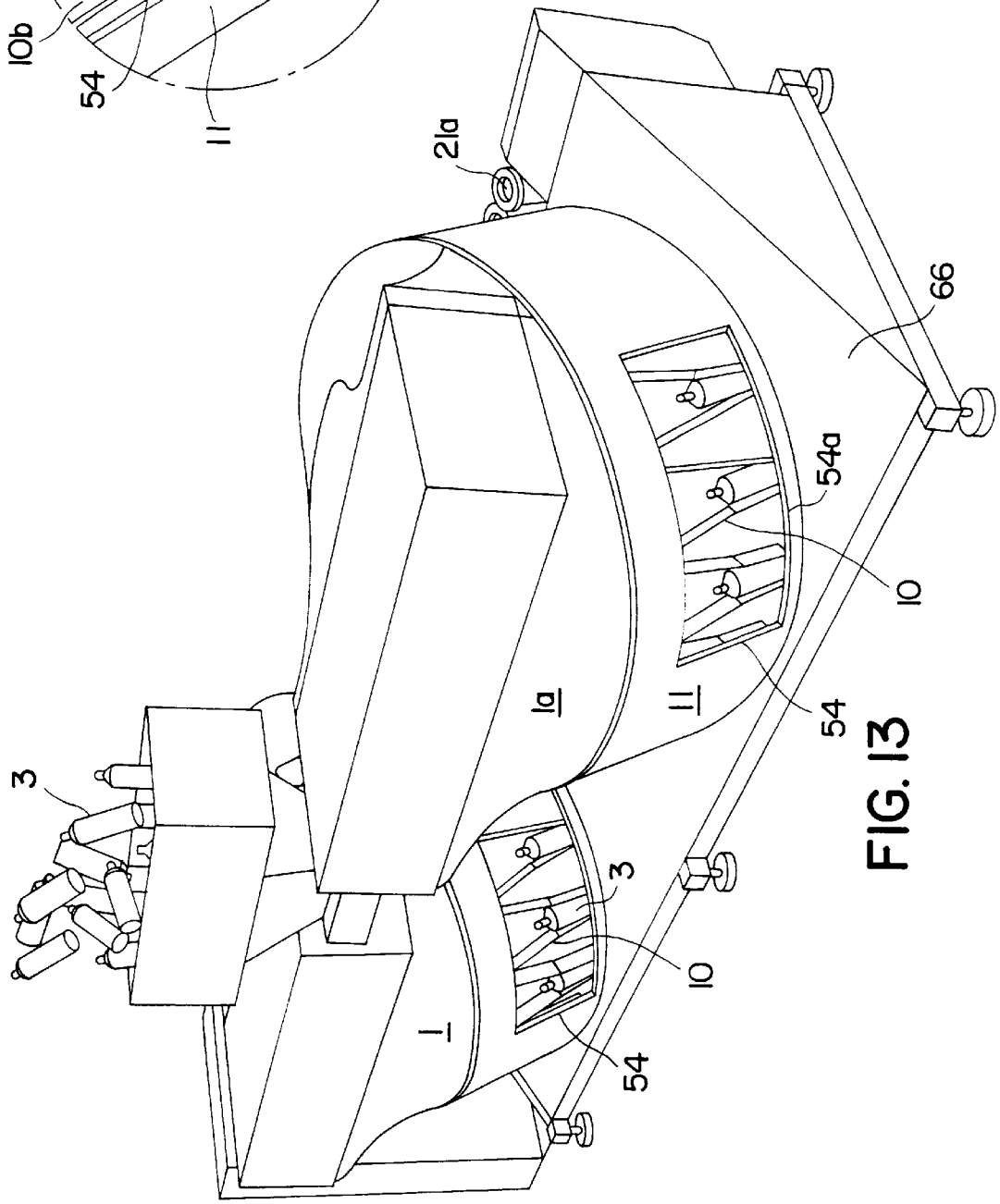
FIG. 13 is a perspective view of a facility as per the invention including two unscrambler units associated to an exit conveyor and provided with a lateral opening for dropping out those containers having eventually got stuck in the discharge chutes.

According to the invention and as shown in FIGS. 13 and 14, a large opening 54 has also been provided in the side wall of casing 11 of unscrambler units 1, 1a in a zone wherein said wall as well as the corresponding discharge chutes 10 provided for the discharge of containers 3 and delimited by said casing are inclined towards the outside Said lateral zone wherein opening 54 has been provided is at a lower level, approximately opposite to the zone wherein containers 3 are discharged in chutes 10. As it can be appreciated in FIG. 14, the lower edge 54a of said opening 54 is at a distance from the supporting stationary floor 12 on which containers 3 are slidingly conveyed by discharge chutes 10 which is equivalent to at least the height of said containers 3. When the unit turns, said opening causes those containers 3 which for any reason (faulty or deformed container, etc.) could have been retained or stuck in an intermediary zone of said discharge chutes 10 without having finally landed on said supporting stationary floor 12 to drop to the outside by effect of the gravity and the centrifugal force (see FIG. 14).

Said lateral opening 54 consists in a sensibly oblong window covering several discharge chutes 10, and panels (not illustrated) can be provided attached to casing 11 of unit 1 and shiftable through fastening means such as fastening screws arranged through elongated slots of said panels, in order to adapt the length of said opening 54 or the height of its lower edge 54a, with respect to said supporting stationary floor 12 to the rotation speed of the machine or to the type of containers to be handled.

Said window does also allow to drop other containers having eventually got stuck in chutes 10, and although they have not been illustrated it is foreseen to use means of conventional type for the detection of said containers.

Unscrambling and guiding discharge chutes 10 of one of the units 1 can be appreciated in detail in FIG. 14. Said discharge chutes 10 are formed by an inner wall 10a and two side walls 10b, 10c which are spaced apart from each other and converge downwards by way of funnel, said discharge chutes being closed at their front part by the inner wall of casing 11 which extends downwardly the cylindrical part of hopper 2.

I claim:

1. An automated facility for the unscrambling of light, hollow, elongated articles and for the lined up delivery of said articles such as empty containers made of plastics material with a body and a neck and in particular with an unstable bottom which have to be fed at a high speed into a filling line, comprising:

at least an article unscrambling and lining up unit which delivers said articles one by one and in a preoriented arrangement to the inside of discharge chutes travelling along a closed circuit and thereby conveying said articles with their bottom slidingly resting on a supporting stationary floor, said discharge chutes being delimited by a casing;

a first opening provided in said supporting stationary floor of each of said unscrambling and lining up units;

a second opening in a lower lateral sector of said casing of each of said unscrambling and lining up units, said second opening being placed next to said first opening;

flexible driving means running along a closed circuit and comprising an upper out feeding strand and a lower return strand, provided with a plurality of article receiver members which are close together;

said upper out feeding strand extending along an area situated below said first opening in such a way that said article receiver members are at a given time close to a lower end of said discharge chutes and operationally coaligned with them for a transfer by gravity of said articles to the inside of said article receiver members;

said transfer by gravity taking place when said articles fall through said first opening;

said container receiver members having a holding aperture;

said container receiver members being linked by a lateral region of their base in a hinged connection with a plate attached to said flexible driving means so that said container receiving members are capable of adopting at least two positions: a first one with said holding aperture close to and facing said first opening and with a symmetry axis of said holding aperture coaligned with said discharge chutes, and a second position with said symmetry axis conveniently oriented in correspondence with a sequential positioning of said article receiver members next to an exit conveyor provided to feed said filling line.

2. A facility as per claim 1, and further comprising:

means to synchronize the speed of said flexible driving means and of said unscrambling and lining up units in such a way that each article unscrambling and lining up unit does cyclically discharge a container into one of every n article receiver members of said flexible driving means, n being equal to the number of unscrambling units of said facility, said group of n article receiver members being thus filled according to an ordered sequence;

said discharge chutes of said unscrambling units, being conveniently spaced in order to allow those article receiver members already loaded with an article to be placed in an area between said discharge chutes of another unscrambling and lining up unit, said article receiver members already loaded with an article entering said area through said second opening of said other units.

3. A facility as per claim 2, wherein further comprising a station for a transfer of said articles from said article receiver members to an exit conveyor provided to feed said filling line.

4. A facility as per claim 3, wherein said article receiver members are removably linked in a hinged connection to said flexible driving means in such a way that they can be quickly detached from said flexible driving means thereby constituting interchangeable units with a format adapted to that of said articles.

5. A facility as per claim 1, wherein:

said article receiver members adopt a shape of a pot with an opening provided in a bottom thereof;

said opening has a dimension such that it allows a passage therethrough of a part of said article being accidentally upside down.

6. A facility as per claim 2, wherein at least one of said container receiver members of said flexible driving means has particular identification element to establish one of said unscrambling units which is supposed to load it.

7. A facility as per claim 2, wherein said means for synchronizing the speed of said flexible driving means with that of said unscrambling units of said facility comprise:

control means associated with reference detectors of each of said unscrambling units for detecting of moving parts thereof, and control means associated with detectors of said identification elements of said container receiver members.

8. A facility as per claim 3, wherein in the case of containers with an unstable bottom and provided with a collar or rib in a zone of their neck said station for the transfer of said articles comprises means for guiding said neck, such as both guides showing a slight ascending slant with respect to the sense of travel of said flexible driving means, being adapted to said bearing collar and being besides associated with a conveyor provided to pick up said containers.

9. A facility as per claim 3, wherein:

in the case of containers with a stable bottom said container receiver members are provided with a lateral opening for a transversal removal of said containers towards said exit conveyor which is adjacent lateral and opposite to said opening;

said container receiver members have a deep recess which reaches a cavity thereof;

a stationary lateral bar has been provided which extends obliquely above said flexible driving means and affects said recess when said container receiver members pass said bar;

said bar acts as a switch for transferring said containers to said lateral exit conveyor which is coplanar with and adjacent said flexible driving means and travels at the same speed.

10. A facility as per claim 1, further comprising a large lateral opening provided in a side wall of said delimiting casing of said unscrambling and lining up units at a lower level, in a zone wherein said wall as well as said discharge chutes delimited by said casing are inclined towards the outside.

11. A facility as per claim 1, wherein:

each of said container unscrambling and lining up units comprises a hopper and a casing formed by a cylindrical shell whose symmetry axis coincides with a geometric rotation inclined axis of a central, rotary disk of said unit; and said discharge chutes are as well distributed in an arrangement in a shape of a cylindrical drum coaxial with said symmetry axis.

12. A facility as per claim 1 wherein:

said flexible driving means are constituted by an endless chain conveyor connected to a driving motor; said plate attached to said flexible driving means has a through hole;

said base is oblique with respect to said symmetry axis of said holding aperture of said article receiver member, in such a way that said article receiver members tend by gravity to rest with said base on said plate in an inclined position.

13. A facility as per claim 12 wherein:

at an upper part of said conveyor and at a side thereof which is closer to said unscrambling unit a guide has been provided which is very close to a row of article receiver members linked to said conveyor;

said guide comprises a portion which is ascendingly biased towards the inside and is provided to cause said article receiver members to tilt in such a way that they are capable of adopting at least two positions, a first one coaligned with said discharge chutes and a second position in correspondence with said transfer station.

14. A facility as per claim 12 and further comprising a second guide at a side of conveyor which is farther away from said unscrambling units, said article receiver members then laterally resting on said second guide which thus maintains said article receiver members in a position in which their base is in full contact with said plate.

15. An automated facility for the unscrambling of light, hollow, elongated articles and for the lined up delivery of said articles such as empty containers made of plastics material with a body and a neck and in particular with an unstable bottom which have to be fed at a high speed into a filling line, comprising:

at least an article unscrambling and lining up unit which delivers said articles one by one and in a preoriented arrangement to the inside of discharge chutes travelling along a closed circuit and thereby conveying said articles with their bottom slidingly resting on a supporting stationary floor, said discharge chutes being delimited by a casing;

a first opening provided in said supporting stationary floor of each of said unscrambling and lining up units;

a second opening in a lower lateral sector of said casing of each of said unscrambling and lining up units, said second opening being placed next to said first opening; and flexible driving means running along a closed circuit and comprising an upper out feeding strand and a lower return strand, provided with a plurality of article receiver members which are close together;

said upper out feeding strand extending along an area situated below said first opening in such a way that said article receiver members are at a given time close to a lower end of said discharge chutes and operationally coaligned with them for a transfer by gravity of said articles to the inside of said article receiver members;

said transfer by gravity taking place when said articles fall through said first opening;

said container receiver members being provided in the case of containers with a stable bottom with a lateral opening for a transversal removal of said containers towards an exit conveyor which is adjacent lateral and opposite to said opening; and said container receiver members have a deep recess which reaches a cavity thereof; and a stationary lateral bar extending obliquely above said flexible driving means and affecting said recess when said container receiver members pass said bar;

said bar acts as a switch for transferring said containers to said lateral exit conveyor which is coplanar with and adjacent said flexible driving means and travels at the same speed.

16. An automated facility for the unscrambling of light, hollow, elongated articles and for the lined up delivery of said articles such as empty containers made of plastics material with a body and a neck and in particular with an unstable bottom which have to be fed at a high speed into a filling line, comprising:

at least an article unscrambling and lining up unit which delivers said articles one by one and in a preoriented arrangement to the inside of discharge chutes travelling along a closed circuit and thereby conveying said articles with their bottom slidingly resting on a supporting stationary floor, said discharge chutes being delimited by a casing;

a first opening provided in said supporting stationary floor of each of said unscrambling and lining up units;

a second opening in a lower lateral sector of said casing of each of said unscrambling and lining up units, said second opening being placed next to said first opening; and flexible driving means running along a closed circuit and comprising an upper out feeding strand and a lower return strand, provided with a plurality of article receiver members which are close together;

said upper out feeding strand extending along an area situated below said first opening in such a way that said article receiver members are at a given time close to a lower end of said discharge chutes and operationally coaligned with them for a transfer by gravity of said articles to the inside of said article receiver members;

said transfer by gravity taking place when said articles fall through said first opening;

said article receiver members adopting a shape of a pot with an opening provided in a bottom thereof;

said opening having a dimension such that it allows a passage therethrough of a part of said article being accidentally upside down.

17. A facility as per the claim 16, and further comprising:

a station for a transfer of said articles from said article receiver members to an exit conveyor provided to feed said filing line;

said transfer station, in the case of containers with an unstable bottom and provided with a collar or rib in a zone of their neck, comprises means for guiding said neck, with guides showing a slight ascending slant with respect to the sense of travel of said flexible driving means, being adapted to said bearing collar and being besides associated with a conveyor provided to pick up said containers.

18. A facility as per the claim 16, and further comprising:

means to synchronize the speed of said flexible driving means and of said unscrambling and lining up units in such a way that each article unscrambling and lining up unit does cyclically discharge a container into one of every n article receiver members of said flexible driving means, n being equal to the number of unscrambling units of said facility, said group of n article receiver members being thus filled according to an ordered sequence;

said discharge chutes of said unscrambling units, being conveniently spaced in order to allow those article receiver members already loaded with an article to be placed in an area between said discharge chutes of another unscrambling and lining up unit, said article receiver members already loaded with an article entering said area through said second opening of said other units.

* * * * *